PAUL E. NOTHNAGLE
HAROLD E. ROSENBERGER
INVENTORS

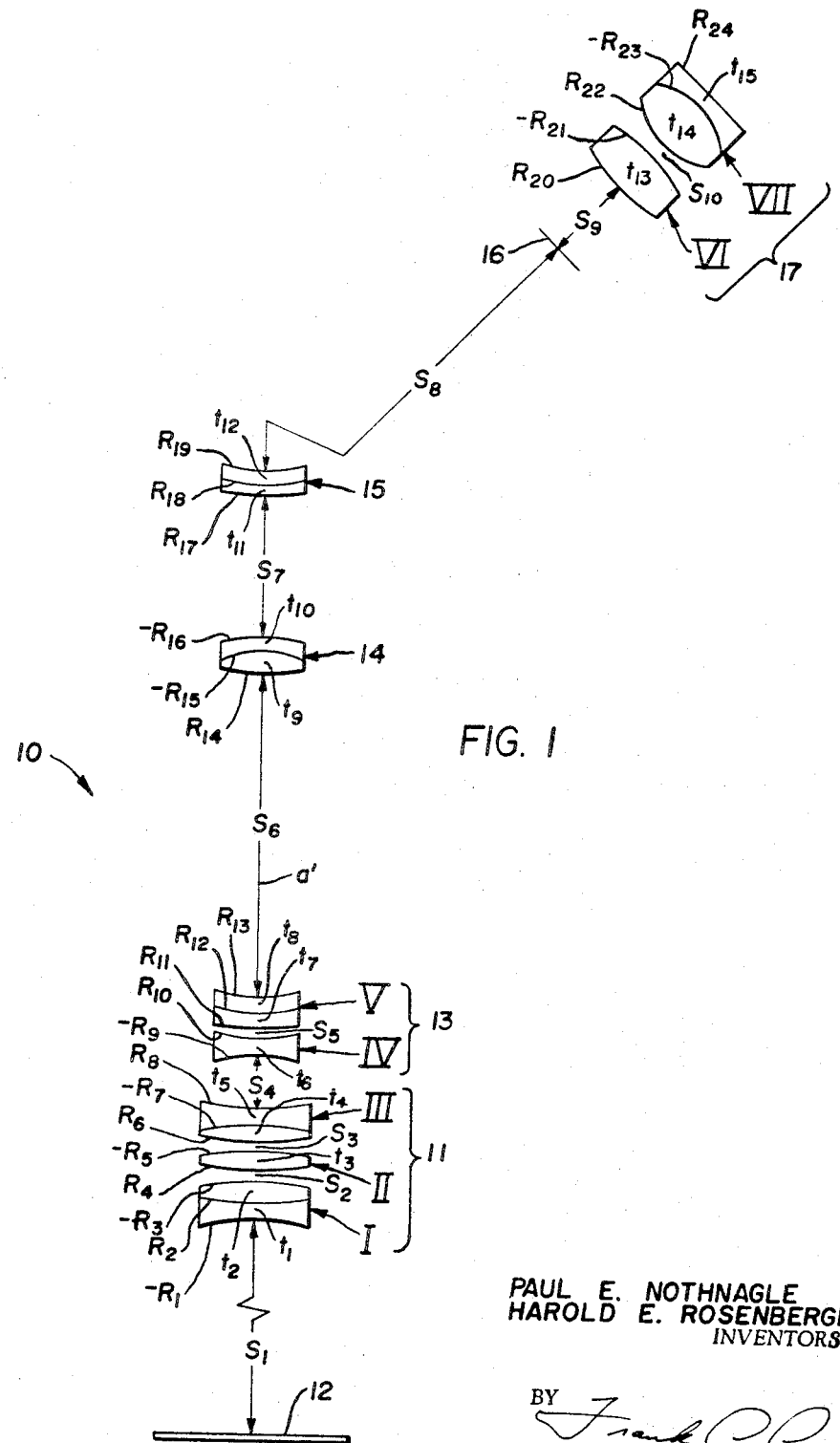

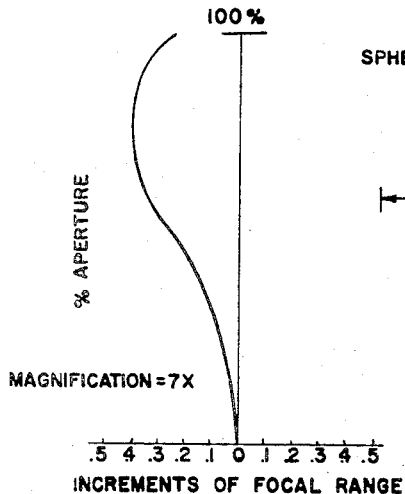
FIG. 3A
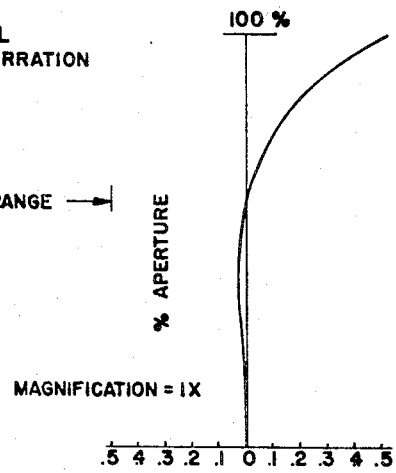
FIG. 3B
FIG. 4A
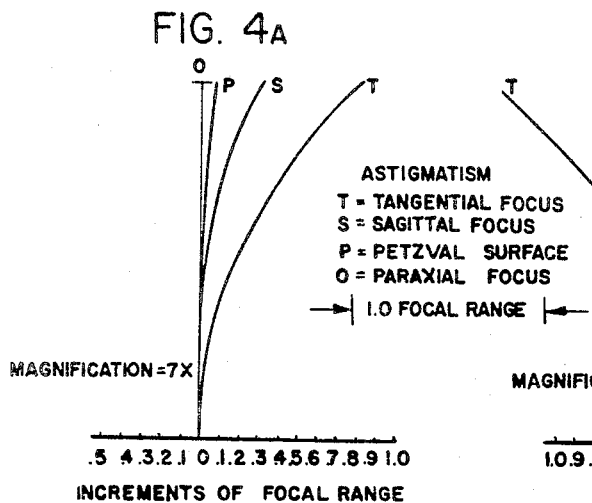
FIG. 4B
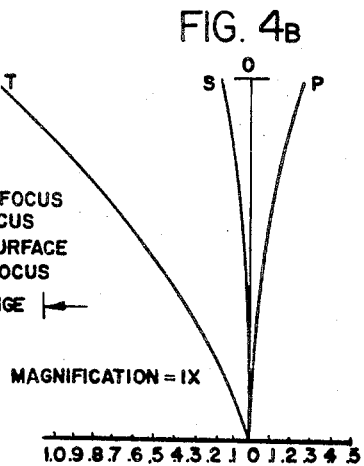
PAUL E. NOTHNAGLE
HAROLD E. ROSENBERGER
*INVENTORS*
BY Frank C. Parker
ATTORNEY

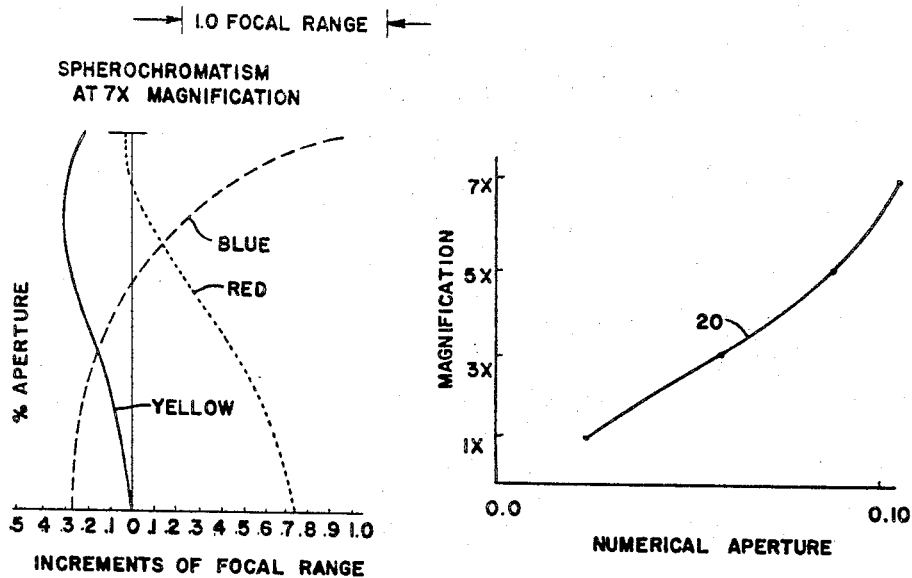
FIG. 5
FIG. 7
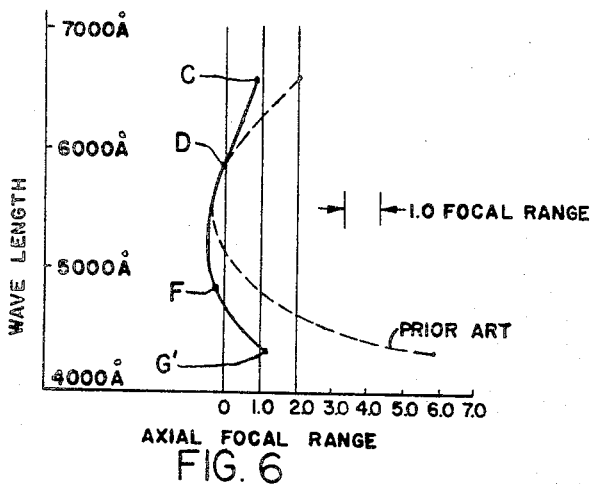
FIG. 6

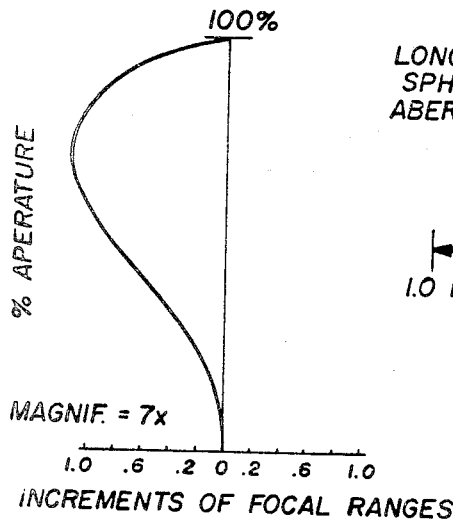
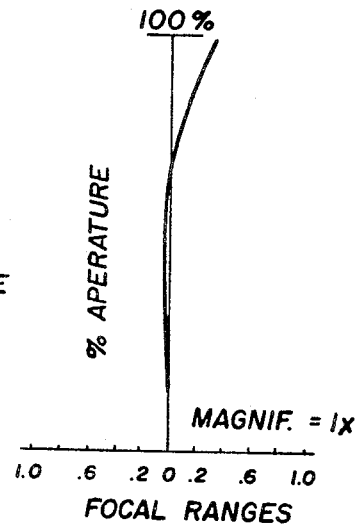
FIG. 9
FIG. 10
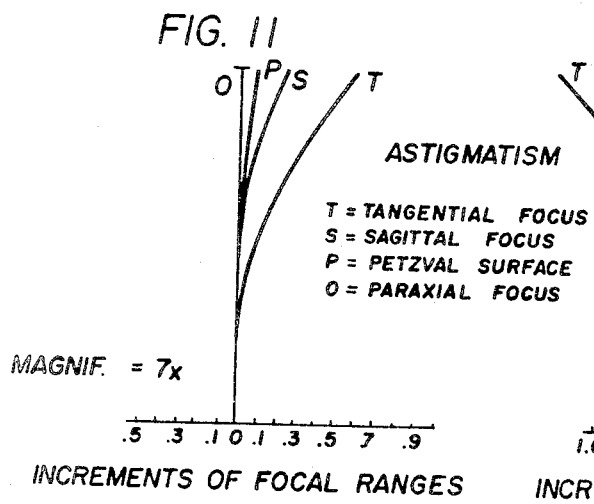
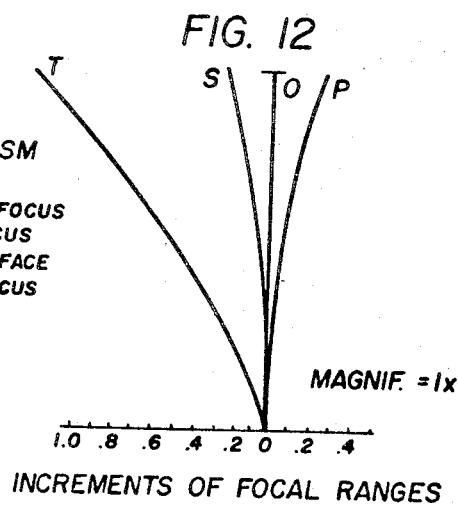
FIG. 11
FIG. 12
PAUL E. NOTHNAGLE
HAROLD E. ROSENBERGER
INVENTORS
BY
ATTORNEY

United States Patent Office 3,421,807
Patented Jan. 14, 1969

3,421,807
ZOOM LENS SYSTEM FOR MICROSCOPE
Paul E. Nothnagle, Rochester, and Harold E. Rosenberger, Brighton, N.Y., assignors to Bausch & Lomb Incorporated, Rochester, N.Y., a corporation of New York
Continuation-in-part of application Ser. No. 368,236, May 18, 1964. This application Sept. 8, 1967, Ser. No. 674,034
U.S. Cl. 350—43                        12 Claims
Int. Cl. G02b 7/04, 15/00

ABSTRACT OF THE DISCLOSURE

A zoom lens system which is one of the two similar lens systems used in a stereomicroscope, said system having a continuous range of magnification at least as large as 7:1 and wherein the numerical aperture of said system is varied substantially continuously linearly with the change in magnification without significantly changing the good state of correction of the image aberrations, particularly the correction of secondary spectrum.

CROSS REFERENCES TO RELATED APPLICATIONS

Application of Paul E. Nothnagle and Harold E. Rosenberger, S.N. 368,236, filed May 18, 1964, now abandoned, the present patent application being a continuation-in-part thereof.

BACKGROUND OF INVENTION

Zoom lens systems of the kind disclosed herebelow are useful in microscopes wherein a continuous change of magnification of the image is desired over an interval or range from minimum to maximum magnification values. Such lens systems are particularly useful inter alia in stereomicroscopes when the lens systems are designed with a long working distance between the lens system and the object surface to be viewed.

The design problem for zoom type lens systems used in stereomicroscopes therefore includes provision of a long working distance along with a maximum numerical aperture, low distortion, good correction of all image aberrations, and stationary image.

The above mentioned problems have been met to some degree in low cost microscopes such as shown in 3,057,259 (Schuma) but such lens systems because of the difficulty of obtaining high grade corrections of the imaging aberrations by any simple and low cost means are limited to low zoom ranges below 3:1 ratio. The present state of the art in photographic zoom lens systems is shown by Harris 3,038,378 issued June 12, 1962 wherein the front focus is at infinity and the range of magnification is 4:1 which would not be considered to be a high value in microscope practice by the present criteria. In fact, any increase in magnification range beyond 4:1 requires the best efforts of competent designers in new approaches if the chromatic and monochromatic image aberrations are to be well corrected. Among the more desirable criteria are increased numerical aperture, low distortion and improved secondary spectrum or residual chromatism.

SUMMARY OF THE INVENTION

The present invention relates to optical systems for microscopes, particularly of the stereomicroscopic kind, and more particularly relates to improvements which include a so-called zoom optical system therefor.

It is an object of the present invention to provide a zoom type of optical system for use particularly in stereomicroscopes, said system having a generally superior optical performance without incurring prohibitively high manufacturing cost.

A further object is to provide such a device in which the numerical aperture is increased beyond the usual value and is varied approximately directly with image magnification on the object side of the optical system, the numerical aperture on the image side being constant so that substantially constant brightness of the image is obtained at all magnifications.

It is another object to provide such a device which is characterized by an excellent state of correction for spherical aberration, astigmatism, chromatic aberration, and secondary spectrum, and additionally is characterized by low distortion and a flat field.

Further objects and advantages reside in the form, arrangement and constructional details of the parts of said optical system as described in the specification herebelow taken in connection with the accompanying drawings.

BRIEF DESCRIPTION OF THE DRAWINGS

FIG. 1 is an optical diagram showing one form of the present invention;

FIGS. 3A and 3B are graphical representations showing the spherical aberration in the optical system for the high magnification and low magnification positions respectively of the zoom lenses;

FIGS. 4A and 4B are graphical representations showing the condition of tangential and sagittal focus in said optical system at high magnification and low magnification positions respectively of the zoom lenses;

FIG. 5 is a graphical representation showing spherochromatism in the optical system when working at high magnification;

FIG. 6 is a graphical representation showing the state of achromatization of said optical system particularly with regard to secondary spectrum when working at high magnification;

FIG. 7 is a graphical representation of numerical aperture variation plotted against image magnification;

FIGS. 9, 10, 11, 12, 13, 14 and 15 correspond to FIGS 3A, 3B, 4A, 4B, 5, 6 and 7 with respect to a second form of the invention.

DESCRIPTION OF FIRST FORM OF INVENTION

Figure 8:
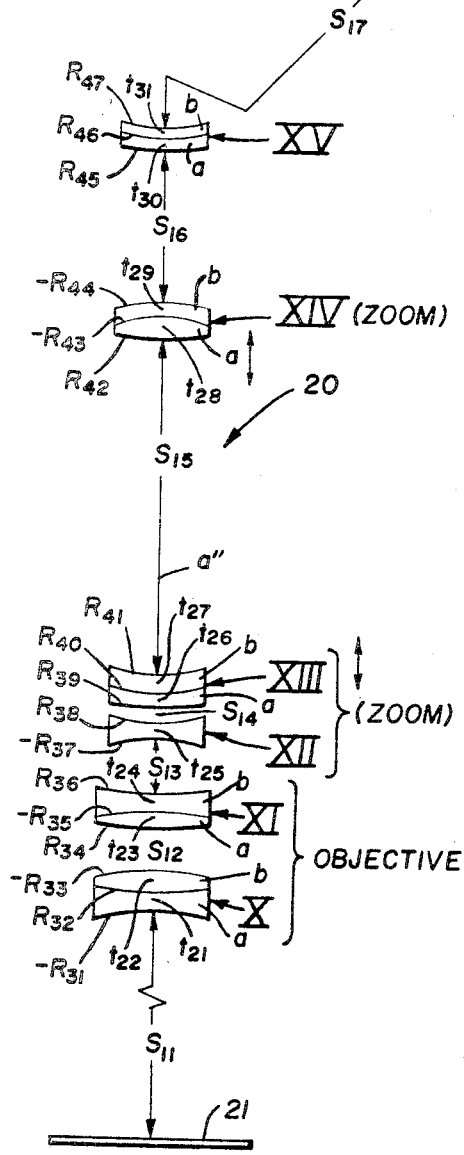
FIG. 8 is an illustration similar to FIG. 1 showing a second form of the invention.

One form of optical lens system disclosed herebelow is designated by the numeral 10 in FIG. 1 of the drawings, said system particularly as regards its objective lens structure being advantageously adapted to stereomicroscopes.

Comprised in the optical system 10 is an objective 11 which is located on an optical axis $a'$ and is symmetrically constructed of two positive meniscus doublets designated I and III which are convex toward an intervening biconvex singlet designated II, the singlet being equally spaced by contiguous axial air spaces designated $S_2$ and $S_3$ from said doublets. Each said doublet includes a double convex lens element located on the side of the singlet II and further includes a double concave lens element located in contact with the outer surface of said double convex elements.

Ideally, the singlet II is truly a symmetrical lens and the doublets I and III are substantially duplicates of each other. However, it is virtually impossible in practice to make similar optical lens elements as absolute dimensional duplicates of each other to achieve the desired focal balance of two objectives. For that reason, a form of objective which includes a plurality of duplicate parts in its design has the distinct advantage that a large number of similar but not exact duplicate lens elements having slightly different focal lengths within established tolerances from any production run may be selectively grouped together to produce a pair of objectives having the same power and other optical properties.

With regard to the tables of parameter values appearing hereinafter, it will be seen that the value of each optical parameter is given as a range of values for the respective optical parameters as prescribed for the primary purpose of facilitating manufacture of the lens elements. It is well known in the art that it is practically impossible to manufacture a production run of lens elements economically while holding all of the lens parameters to specific and ideal values. Therefore, the lens designer specifies tolerances or ranges of values for each lens parameter within which the lens parts may be manufactured economically and nevertheless produced a completed objective which is capable of good optical performance. The technique used by skilled optical workers is to separate out or grade the lens elements which fall within said ranges of values and selectively assemble from these elements a complete optical system 10. This technique is highly successful in producing economically a good optical system.

The numerical values of the focal lengths of said doublets I and III should be as near equal as commercially possible and, the focal length values of the double concave lens elements should be between $-1.066$ times to $-1.110$ times the focal length of said double convex lens elements, and ideally the numeral should be 1.088. The numerical value of the focal length of each of said doublets I and III should lie between 7.552 times and 7.860 times the focal length of the objective and ideally should be 7.706 times. Furthermore, the focal length of the intervening singlet lens II should be between $1.492F$ and $1.552F$ where F is the focal length of the objective 11, the ideal value being substantially $1.522F$. Said objective is located at a fixed axial distance designated $S_1$ from the object plane 12.

Spaced rearwardly of the objective 11 at a variable axial distance designated $S_4$ is a first movable zoom lens designated 13, said lens being composed of a front double concave lens IV and a rear doublet meniscus lens V spaced therefrom by a fixed distance $S_5$. The focal length of the front zoom lens 13 is designated $F_4$ and is negative and has a numerical value between $-.637F$ and $-.663F$ where F represents the focal length of the entire objective 11, the ideal value being substantially $-.650F$. With regard to the component parts, lens IV has a negative focal length $F_{IV}$ with a value of $-1.214F$ to $-1.264F$, and doublet lens V has a negative focal length $F_V$ with a value of $-1.452F$ to $-1.512F$, the minus ($-$) sign in each occurrence signifying negative focal length. The ideal values for $F_{IV}$ and $F_V$ are substantially $1.239F$ and $1.482F$.

The zoom system further comprises a second movable zoom lens 14 which is spaced at a variable axial distance designated $S_6$ away from the first zoom lens, the second zoom lens having a positive focal length designated $F_{14}$ of numerical value $1.303F$ to $1.356F$. Ideally, the value of $F_{14}$ is substantially $1.329F$. Zoom lens 14 is a doublet which is composed of a positive front double convex lens element in contact with a negative rear meniscus lens element, the numerical ratio of the focal lengths of the front to the rear element being substantially $-.620$.

Image rays leaving lens 14 are refracted by a stationary relay lens 15 which is spaced at a variable distance designated $S_7$ along the optical axis $a'$ from lens 14 and acts in the manner of a Barlow lens to extend the focal length and flatten the field. Said lens has a negative focal length $F_{15}$, the value of which lies between $-2.321F$ to $-2.416F$ and ideally is substantially $-2.369F$. Composing the relay lens 15 are a front negative meniscus lens element which lies in contact with a rear positive meniscus lens element so that the entire lens is convex toward entrant light. The ratio of the numerical value of the focal lengths of said front element to the numerical value of the rear element is substantially $-.464$.

Figure 2:
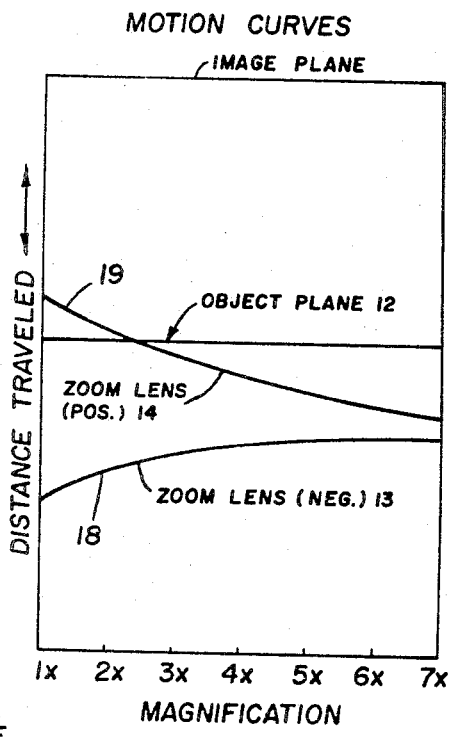
FIG. 2 is a graphical illlustration of the movement of the movable elements of said zoom lens system.

At an image plane 16 located at an axial distance designated $S_8$ further rearwardly, the previously recited lenses cooperatively form a stationary image of variable magnification through a continuous magnification range of $1\times$ to $7\times$, the zoom lenses 13 and 14 being relatively moved along smooth motion curves 18 and 19 respectively through the position points indicated in the table of thick lens variable air spaces $S_4$, $S_6$, and $S_7$ given nominally herebelow as to maintain the stationary position of said image. Curves 18 and 19 are shown in FIG. 2.

| Magnification | $S_4$ | $S_6$ | $S_7$ |
|---|---|---|---|
| 1.0× | .127F | 2.043F | .864F |
| 3.0× | .621F | 1.001F | 1.412F |
| 5.0× | .762F | .506F | 1.766F |
| 7.0× | .834F | .155F | 2.045F |

The above values should not vary more than $\pm.12F$ in order to provide a final image for the system which is optically commercially acceptable.

In order to maintain substantially constant unit illumination throughout the entire field of the instrument for all magnifications of the image, the numerical aperture is varied substantially linearly with magnification as shown by the curve 20 in FIG. 7 where values of numerical aperture are plotted against values of magnification of said images.

Focused at the image plane 16 is an eyepiece 17 which is so designed with reference to the other lenses in the optical system as to correct excessive astigmatism at low power as described hereinafter while providing a high grade of correction for all image aberrations in the final image produced thereby. Eyepiece 17 may be provided in a plurality of powers using the optical form described herebelow, said form comprising a front double convex singlet lens VI which is located at a constant axial distance designated $S_9$ rearwardly from the focal plane 16. Further comprised in said eyepiece 17 is a plano convex doublet lens VII which is separated from lens VI by an axial distance designated $S_{10}$. Doublet lens VII consists of a front double convex lens element which lies in contact with a rearmost plano concave element.

Two successful constructions for the eyepieces 17 are disclosed in detail herebelow, each of which possesses substantially the same optical performance qualities. One such eyepiece is rated at $10\times$ power or magnification and the value of its equivalent focal length $F_{17}$ lies between $.588F$ and $.612F$. Another eyepiece is rated at $15\times$ and the numerical value of its equivalent focal length $F_{17}$ lies between $.394F$ and $.410F$. The ideal values of focal lengths $F_{17}$ ($10\times$), and $F_{17}$ ($15\times$) are $.600F$ and $.402F$ substantially respectively.

As shown in FIG. 1, the axial thicknesses of the successive lens parts of the lens system numbering from the front are designated $t_1$ to $t_{15}$ and the values thereof are given in the table of mathematical statements herebelow together with the values of the aforementioned axial spaces $S_1$ to $S_{10}$, $m$ denoting the image magnification.

$.060F < t_1 < .070F$
$.081F < t_2 < .091F$
$.065F < t_3 < .075F$
$.081F < t_4 < .091F$
$.060F < t_5 < .070F$ $.035F < t_6 < .044F$
$.035F < t_7 < .044F$
$.035F < t_8 < .044F$
$.065F < t_9 < .075$
$.037F < t_{10} < .047F$
$.028 < t_{11} < .037F$
$.028 < t_{12} < .037F$ $S_1$ focusable from nominal $1.877F$ $.0081F < S_2 < .0105F$
$.0081F < S_3 < .0105F$
$.057F < S_4 < .197F$ ($m=1\times$)
$.551F < S_4 < .691F$ ($m=3\times$)
$.692F < S_4 < .832F$ ($m=5\times$)
$.764F < S_4 < .904F$ ($m=7\times$)
$.015F < S_5 < .017F$
$1.903F < S_6 < 2.183F$ ($m=1\times$)
$.861F < S_6 < 1.140F$ ($m=3\times$)
$.366F < S_6 < .646F$ ($m=5\times$)
$.015F < S_6 < .294F$ ($m=7\times$)
$.724F < S_7 < 1.004F$ ($m=1\times$)
$1.272F < S_7 < 1.552F$ ($m=3\times$)
$1.626F < S_7 < 1.906F$ ($m=5\times$)
$1.906F < S_7 < 2.185F$ ($m=7\times$)
$2.810F < S_8 < 3.089F$ (10× EYEPIECE PER SE)

$.182F < t_{13} < .191F$
$.226F < t_{14} < .236F$
$.030F < t_{15} < .040F$
$.490F < S_9 < .494F$
$.068F < S_{10} < .072F$ (15× EYEPIECE PER SE)

$.121F < t_{13} < .130F$
$.151F < t_{14} < .161F$
$.019F < t_{15} < .028F$
$.347F < S_9 < .352F$
$.0046F < S_{10} < .0093F$

An advantageous choice of glasses particularly as to Abbé number thereof for the successive lens elements in the optical system 10 effects a fine state of achromatization of the final image and provides a superior correction for all monochromatic aberrations in the image as well. Absolute numerical values for the refractive index and Abbé number of said glasses are given in the table herebelow wherein $n_D$ and $\nu$ represent refractive index and Abbé number respectively.

| Index / Abbe | Element |
|---|---|
| $1.6115 < n_D < 1.6145$, $43.9 < \nu < 44.5$ | Lenses I and III, double concave element. |
| $1.513 < n_D < 1.515$, $69.7 < \nu < 70.7$ | Lenses I and III, double convex element. |
| $1.513 < n_D < 1.515$, $69.7 < \nu < 70.7$ | Lens II. |
| $1.516 < n_D < 1.518$, $64.0 < \nu < 65.0$ | Front zoom lens, double concave element. |
| $1.516 < n_D < 1.518$, $64.0 < \nu < 65.0$ | Front zoom lens, negative meniscus element. |
| $1.718 < n_D < 1.722$, $29.1 < \nu < 29.5$ | Front zoom lens, positive meniscus element. |
| $1.5715 < n_D < 1.5735$, $56.9 < \nu < 57.9$ | Double convex element, Rear zoom lens. |
| $1.6155 < n_D < 1.6185$, $36.3 < \nu < 36.9$ | Negative meniscus element, Rear zoom lens. |
| $1.516 < n_D < 1.518$, $64.0 < \nu < 65.0$ | Negative meniscus element, Relay lens. |
| $1.718 < n_D < 1.722$, $29.1 < \nu < 29.5$ | Positive meniscus element, Relay lens. |
| $1.513 < n_D < 1.515$, $69.7 < \nu < 70.7$ | Eyepiece, Lens VI |
| $1.513 < n_D < 1.515$, $69.7 < \nu < 70.7$ | Eyepiece, Lens VII, double convex element. |
| $1.6895 < n_D < 1.6925$, $30.4 < \nu < 31.0$ | Eyepiece, Lens VII, Plano concave element. | 15× Power
| $1.513 < n_D < 1.515$, $69.7 < \nu < 70.7$ | Eyepiece, Lens VI. |
| $1.513 < n_D < 1.515$, $69.7 < \nu < 70.7$ | Eyepiece, Lens VII, double convex element. |
| $1.7486 < n_D < 1.7526$, $27.6 < \nu < 28.0$ | Eyepiece, Lens VII, Plano concave element. | 10× Power The successive radii of the lens elements I to VII and 14, 15 are designated $R_1$ to $R_{24}$ and the numerical values of said radii are given in the table of mathematical statements herebelow wherein the minus (−) sign used therewith signifies surfaces which are concave to entrant light or are concave toward the front of the optical system.

| Radii | Lens Group |
|---|---|
| $1.415F < -R_1 < 1.473F$ | |
| $1.155F < R_2 < 1.202F$ | Objective Lens I |
| $.814F < -R_3 < .847F$ | |
| $1.522F < R_4 < 1.584F$ | Objective Lens II |
| $1.522F < -R_5 < 1.584F$ | |
| $.814F < R_6 < .847F$ | |
| $1.155F < -R_7 < 1.202F$ | Objective Lens III |
| $1.415F < R_8 < 1.473F$ | |
| $1.494F < -R_9 < 1.556F$ | Zoom Lens IV |
| $1.093F < R_{10} < 1.137F$ | |
| $18.642F < R_{11} < 19.402F$ | Front Zoom Lens |
| $.274F < R_{12} < .286F$ | Zoom Lens V |
| $.486F < R_{13} < .506F$ | |
| $2.007F < R_{14} < 2.089F$ | |
| $.318F < -R_{15} < .330F$ | Rear Zoom Lens |
| $.978F < -R_{16} < 1.018F$ | |
| $1.389F < R_{17} < 1.445F$ | |
| $.451F < R_{18} < .469F$ | Relay Lens |
| $.563F < R_{19} < .585F$ | |
| $.997F < R_{20} < 1.037F$ | Eyepiece Lens VI |
| $.997F < -R_{21} < 1.037F$ | |
| $.469F < R_{22} < .487F$ | |
| $.543F < -R_{23} < .565F$ | Eyepiece Lens VII | Eyepiece Power=10×
| $R_{24} \pm > 10.0F$ | |
| $.677F < R_{20} < .705F$ | Eyepiece Lens VI |
| $.677F < -R_{21} < .705F$ | |
| $.343F < R_{22} < .355F$ | |
| $.343F < -R_{23} < .355F$ | Eyepiece Lens VII | Eyepiece Power=15×
| $R_{24} \pm > 10.0F$ | |

Using the values given in the above and subsequent tables, zoom optical systems having a magnification range of at least 1× to 7× may be provided in which an excellent state of correction of image aberrations is maintained throughout the magnification range. The correction for longitudinal spherical aberration is shown in FIGS. 3A and 3B of the drawings for 7× and 1× conditions respectively where it will be noticed that the magnitude of the aberration is reduced to a value less than 1.0 F.R. (meaning focal range), the theory being that for all spherical aberration less than 1.0 F.R., the optical system is diffraction limited.

Correspondingly, the sagittal and tangential foci are identified by S and T in FIGS. 4A and 4B which respectively show the astigmatic aberration at the extreme ends of the magnification range 1× to 7×. In FIG. 4B it is noticed that the tangential focus has a value greater than 1.0 F.R. but this is finally reduced by designing the eyepiece with enough over-corrected astigmatism to reduce said aberration at 1× to less than 1 F.R. and at the same time increase the astigmatism at 7× to just under 1 F.R.

All of the above-mentioned advantageous imaging properties of the optical system are obtained along with a remarkably low distortion which never exceeds 1.4%, at the low end of the magnification range. Furthermore, the magnitude of the offense against the Abbé sine condition never exceeds 0.10% and the chromatic difference in magnification of the image is less than 0.08%, all of which is measured at the extreme edge of the maximum field of view, exclusive of either eyepiece.

The longitudinal spherochromatism is shown by the curves in FIG. 5 wherein the wavelengths for C, D and F light versus percentage of aperture are plotted. These curves show that the spherochromatism condition of the optical system is optimized by correcting the C and F focus at the 7/10 zone of the aperture.

With regard to the state of achromatization in the image, it will be seen in FIG. 6 that the magnitude of chromatic aberration for all wavelengths of radiation between the C and F lines of the spectrum lies within 1.3 F.R.

In addition, the secondary spectrum or the axial image position for light of wavelengths which are shorter than F light, as shown, is corrected to a superior degree.

The partial dispersion qualities of the glasses chosen for the stationary objective lens 11 are such that the resultant secondary spectrum in the final image is reduced to approximately half of that which would result from the use of ordinary glasses. The term "partial dispersion"

represented by $\beta$ may be expressed by the following mathematical expression:

$$\beta = \frac{n_{\lambda 1} - n_{\lambda 2}}{n_F - n_C}$$

By the term "ordinary glasses" is meant those glasses which lie along a linear curve formed by plotting increments of partial dispersion against the value of refractive index.

As observed in FIG. 7, the numerical aperture varies approximately in direct proportion to changes of image magnification on the object side of the system which results in a constant numerical aperture on the image side of the system. This means that the image has a substantially constant brightness throughout all magnifications thereof and a constant diameter of exit pupil although in the precise form of the optical system here described, the exit pupil diameter varies to the extent of about 1.6 times original value, while magnification varies 7 times.

The specific constructional data for a preferred form of the above-described optical system 10 is given substantially in the table of mathematical statements herebelow, the symbolism being the same as heretofore wherein F designates the focal length of objective 11.

$F_I = 7.607F$
$F_{II} = 1.522F$ } Objective
$F_{III} = 7.706F$
$F_{13} = .650F$
$F_{IV} = 1.239F$ } Front zoom lens
$F_V = 1.482F$
$F_{14} = 1.329F$ (Rear zoom lens)
$F_{15} = -2.369F$ (Relay lens)
$F_{17} = .600F$ (10× Power) } Eyepiece
$F_{17} = .402F$ (15× Power)

wherein the minus (—) sign designates negative focal length, and $m$ denotes image magnification.

$-R_1 = 1.444F$
$R_2 = 1.178F$ } Lens I
$-R_3 = .830F$
$R_4 = 1.553F$
$-R_5 = 1.553F$ } Lens II
$R_6 = .830F$
$-R_7 = 1.178F$ } Lens III
$R_8 = 1.444F$
$-R_9 = 1.525F$
$R_{10} = 1.115F$ } Front zoom lens V
$R_{11} = 19.022F$
$R_{12} = .280F$ } Front zoom lens V
$R_{13} = .496F$ (Front zoom lens V)
$R_{14} = 2.048F$
$-R_{15} = .324F$ } Rear zoom lens
$-R_{16} = .998F$
$R_{17} = 1.417F$
$R_{18} = .460F$ } Relay lens
$R_{19} = .574F$
$R_{20} = 1.017F$
$-R_{21} = 1.017F$ } Lens VI
$R_{22} = .478F$
$-R_{23} = .554F$ } Lens VII
$R_{24} = $ Plano
} Eyepiece 10× Power $R_{20} = .691F$
$-R_{21} = .691F$ } Lens VI
$R_{22} = .349F$
$-R_{23} = .349F$ } Lens VII
$R_{24} = $ Plano
} Eyepiece 15× Power $t_1 = .065F$
$t_2 = .086F$
$t_3 = .070F$
$t_4 = .086F$
$t_5 = .065F$
$t_6 = .040F$
$t_7 = .040F$
$t_8 = .040F$
$t_9 = .070F$
$t_{10} = .042F$
$t_{11} = .033F$
$t_{12} = .033F$ $S_1 = 1.877F$
$S_2 = .009F$
$S_3 = .009F$
$S_4 = .127F$ ($m=1\times$)
$S_4 = .621F$ ($m=3\times$)
$S_4 = .762F$ ($m=5\times$)
$S_4 = .834F$ ($m=7\times$)
$S_5 = .016F$
$S_6 = 2.043F$ ($m=1\times$)
$S_6 = 1.001F$ ($m=3\times$)
$S_6 = .506F$ ($m=5\times$)
$S_6 = .155F$ ($m=7\times$)
$S_7 = .864F$ ($m=1\times$)
$S_7 = 1.412F$ ($m=3\times$)
$S_7 = 1.766F$ ($m=5\times$)
$S_7 = 2.045F$ ($m=7\times$)
$S_8 = 2.950F$ (10× EYEPIECE)

$t_{13} = .186F$
$t_{14} = .231F$
$t_{15} = .035F$ $S_9 = .491F$
$S_{10} = .070F$ (15× EYEPIECE)

$t_{13} = .126F$
$t_{14} = .156F$
$t_{15} = .023F$ $S_9 = .348F$
$S_{10} = .007F$

The corresponding specific values of refractive index $n_D$ and Abbé number $\nu$ for the glasses in the respective lenses for said preferred form of the optical system are given in the table of absolute values herebelow, $n_D = 1.613$, $\eta = 44.2$ } Lenses I and III, double concave element
$n_D = 1.514$, $\eta = 70.2$ } Lenses I and III, double convex element
$n_D = 1.514$, $\eta = 70.2$ } Lens II
$n_D = 1.517$, $\eta = 64.5$ } Lens IV
$n_D = 1.720$, $\eta = 64.5$ } Lens V, negative meniscus element } Front zoom lens
$n_D = 1.720$, $\eta = 29.3$ } Lens V, positive meniscus element
$n_D = 1.573$, $\eta = 57.4$ } Rear zoom lens, double convex element
$n_D = 1.617$, $\eta = 36.6$ } Rear zoom lens, negative meniscus element
$n_D = 1.517$, $\eta = 64.5$ } Relay lens, negative meniscus element
$n_D = 1.720$, $\eta = 29.3$ } Relay lens, positive meniscus element
$n_D = 1.514$, $\eta = 70.2$ } Eyepiece, Lens VI
$n_D = 1.514$, $\eta = 70.2$ } Eyepiece, Lens VII positive element } 15× Power
$n_D = 1.691$, $\eta = 30.7$ } Eyepiece, Lens VII negative element
$n_D = 1.514$, $\eta = 70.2$ } Eyepiece, Lens VI
$n_D = 1.514$, $\eta = 70.2$ } Eyepiece, Lens VII, positive element } 10× Power
$n_D = 1.751$, $\eta = 27.8$ } Eyepiede, Lens VII, negative element As mentioned above, the 10× power and 15× power eyepieces 17 are each designed as an integrated part of the entire optical system 10, since both eyepieces are over-corrected for astigmatism to compensate for a residual amount of such astigmatism produced by the preceding lenses. It will also be understood from the foregoing description that other aberrations such as spherical and chromatic aberrations and secondary spectrum are corrected to a superior degree generally, which results in a diffraction limited image at all magnifications within the specified magnification range of about 7:1.

In the second form of invention, the complete optical system is designated by numeral 20 wherein the objective lens group is composed of lenses X and XI. This lens group X, XI as shown in FIG. 8 represents the principal difference between the first and second forms of the present invention although lens parameter changes were made in the remaining lens system to correct the spherical aberration to a condition corresponding to the form shown in FIG. 1. Generally, the first order calculations for the first and second forms of the lens system remain the same, i.e., the relative powers of the various lenses (X, XI) to XVII remain the same.

Comprised in said second form of the invention is an objective lens system composed of a front and a rear meniscus doublet X and XI respectively, above referred to, which have their convex surfaces turned toward each other. Although the doublets X and XI are similar to each other in form, these lenses are not duplicates. Doublet lens X is composed of a front double concave lens element $Xa$ which lies in surface contact with a rear double convex lens element $Xb$, the respective axial thicknesses being designated $t_{21}$ and $t_{22}$. Lens element $Xa$ is located at an axial distance $S_{11}$ from the object surface 21 to be viewed, the distance $S_{11}$ having a nominal value but variable to meet the focusing requirements of the lens system 20 by movement of lenses X and XI as a unit.

Spaced at a constant distance designated $S_{12}$ rearwardly from doublet X along the optical axis $a''$ is the aforementioned doublet XI which is composed of a front double convex lens element $XIa$ which lies in surface contact with a rear double concave lens element $XIb$, the respective axial thicknesses of which are designated $t_{23}$ and $t_{24}$.

The next group of lenses is movable as a unit for image magnification changes along smooth motion curves 18 and 19 showing the chart in FIG. 2, and said group usually identified as a zoom lens group comprises a front double concave lens designated XII which is spaced at a variable axial distance designated $S_{13}$ from doublet XI. Lens XII as an axial thickness designated $t_{25}$.

At a constant axial distance designated $S_{14}$ rearwardly of lens XII is located the doublet lens XIII which is composed of a front negative meniscus lens element designated $XIIIa$ which lies in surface contact with a rear positive meniscus lens element designated $XIIIb$, the doublet being concave toward the rear. The respective axial thicknesses of lens element $XIIIa$ and $XIIIb$ are designated $t_{26}$ and $t_{27}$.

Rearwardly aligned on axis $a''$ with the front zoom lens group XII, XIII is the movable rear zoom lens group XIV, the groups being spaced away from each other by a variable axial airspace designated $S_{15}$. Comprised in rear zoom lens group XIV is a front double convex lens element $XIVa$ having an axial thickness designated $t_{28}$ which lies in surface contact with a rear negative meniscus lens element designated $XIVb$ and having an axial thickness designated $t_{29}$.

At a variable axial distance designated $S_{16}$ rearwardly of the zoom doublet lens XIV is located a stationary relay lens designated XV of meniscus form which relays the image rays to a rearward image plane 22. Relay lens XV is a doublet which is composed of a front negative meniscus lens element designated $XVa$ which lies in surface contact with a rear positive meniscus lens element designated $XVb$, the axial thickness respectively being deignated $t_{30}$ and $t_{31}$. The axial airspace between relay lens XV and the image plane 22 is designated $S_{17}$. Lens XV is concave toward the image plane 22.

An eyepiece 23 is provided to view the image at the image plane 22 whereon it is focused, said eyepiece comprising a front double convex lens designated XVI which is located at a focusable axial distance having a nominal value and designated $S_{18}$ from the image plane 22. The axial thickness of lens XVI is designated $t_{32}$. Spaced therefrom at a constant axial distance designated $S_{19}$ is a rear eyepiece doublet lens designated VII composed of a front double convex lens element designated $XVIIa$ which lies in surface contact with a rear plano concave lens element designated $XVIIb$. The resepctive axial thicknesses of lens elements $XVIIa$ and $XVIIb$ are designated, $t_{33}$ and $t_{34}$.

The radii of the successive refractive surfaces on lenses X to XVII are designated $-R_{31}$ to $R_{52}$, some of these designations being preceded by a minus (−) sign which means that the center of curvature of such a surface lies on the object side of that surface.

As mentioned hereabove, the focal lengths of the respective lens members X to XVII are similar to the corresponding focal lengths given in the first form of the invention and the values thereof fall within the stated ranges given for said first form of the invention.

With reference to FIGS. 9 to 15 of the drawings, optical performance curves are there shown for the second form of optical system shown in FIG. 8, and said figures correspond to FIGS. 3A to 7 which relate to FIG. 1 and the first form of the invention.

Comparing the performance characteristics of the lens system 10, FIG. 1 with the lens system 20 shown in FIG. 8, it will be seen that the elimination of lens II results in some increase of the zonal spherical aberration of lens system 20 but, even so, said aberration is not sufficient to destroy the "diffraction limited" status of said lens system 20 as shown in FIG. 9. However, there are improvements in tangential and sagittal astigmatism as shown in FIGS. 11 and 12 respectively.

Figure 13:
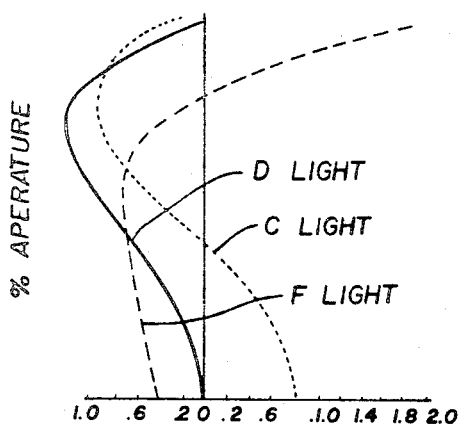
Figure 14:
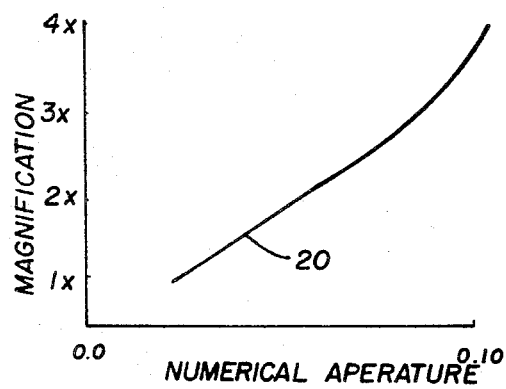
Figure 15:
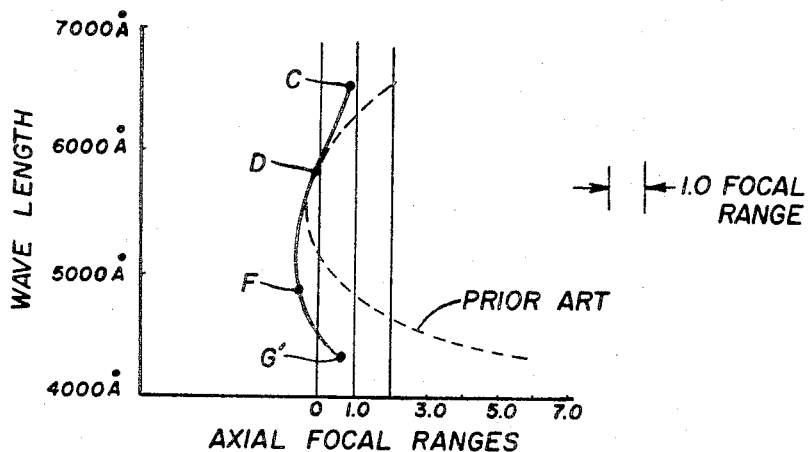

It will be noted in FIG. 13 that spherical aberration in the second form of the invention shown in FIG. 8, for C, F and D light as shown by their respective curves lies substantially within two focal ranges. No substantial change of the variation of numerical aperture with changes of magnification are evident in FIG. 14 representing the second form of the invention as compared to FIG. 7 representing the first form of the invention. Likewise, the secondary spectrum or residual chromatism of the first and second forms of the invention are both very good and, as shown in FIG. 15, the residual chromatism for the second form of the invention is not only greatly improved over the prior art but it is slightly better than the first form of the invention shown in FIG. 1.

The ranges of values for the aforementioned constructional data for $-R_{31}$ to $R_{52}$, $t_{21}$ to $t_{34}$, $S_{11}$ to $S_{19}$, in terms of F, as well as the numerical value for the refractive indices $n_D$ ($Xa$) to $n_D$ ($XVIIb$), and Abbé numbers $\nu$ ($Xa$) to $\nu$ ($XVIIb$) pertaining to the glasses in the lenses X to XVII are given in the table of mathematical statements herebelow.

The choice of ranges of values for the constructional data in the second form of the invention is governed by the same practical manufacturing requirements and tolerances specified in the foregoing statement with regard to the first form of the invention.

TABLE I $9.036F < -R_{31} < 9.405F$
$.738F < R_{32} < .768F$
$.738F < -R_{33} < .768F$
$.711F < R_{34} < .740F$
$.766F < -R_{35} < .797F$
$6.025F < R_{36} < 6.271F$
$1.486F < -R_{37} < 1.546F$
$1.086F < R_{38} < 1.131F$
$18.534F < R_{39} < 19.290F$
$.273F < R_{40} < .284F$
$.483F < R_{41} < .503F$
$1.995F < R_{42} < 2.077F$
$.316F < -R_{43} < .329F$
$.973F < -R_{44} < 1.012F$
$1.459F < R_{45} < 1.518F$
$.474F < R_{46} < .494F$
$.592F < R_{47} < .616F$

10× Eyepiece
$.991F < R_{48} < 1.031F$
$.991F < -R_{49} < 1.031F$
$.466F < R_{50} < .484F$
$.539F < -R_{51} < .561F$
$R_{52} > \pm 10.0$ 15× Eyepiece
$.673F < R_{48} < .700F$
$.673F < -R_{49} < .700F$
$.340F < R_{50} < .354F$
$.340F < -R_{51} < .354F$ $R_{52} > \pm 10.0$
$.065F < t_{21} < .074F$
$.090F < t_{22} < .095F$
$.101F < t_{23} < .105F$
$.065F < t_{24} < .074F$
$.035F < t_{25} < .044F$
$.035F < t_{26} < .044F$
$.035F < t_{27} < .044F$
$.065F < t_{28} < .074F$
$.037F < t_{29} < .046F$
$.030F < t_{30} < .035F$
$.030F < t_{31} < .035F$ 10× Eyepiece
$.181F < t_{32} < .190F$
$.225F < t_{33} < .234F$
$.030F < t_{34} < .039F$ 15× Eyepiece
$.120F < t_{32} < .130F$
$.150F < t_{33} < .160F$
$.019F < t_{34} < .028F$ $S_{11} = 1.889F$ (nominal-focusable)
$.027F < S_{12} < .031F$
(1× M) $.061F < S_{13} < .200F$
(3× M) $.553F < S_{13} < .692F$
(5× M) $.693F < S_{13} < .832F$
(7× M) $.764F < S_{13} < .903F$
$.015F < S_{14} < .017F$
(1× M) $1.892F < S_{15} < 2.170F$
(3× M) $.856F < S_{15} < 1.134F$
(5× M) $.364F < S_{15} < .642F$
(7× M) $.015F < S_{15} < .293F$
(1× M) $.651F < S_{16} < .929F$
(3× M) $1.196F < S_{16} < 1.474F$
(5× M) $1.548F < S_{16} < 1.825F$
(7× M) $1.825F < S_{16} < 2.103F$
$2.947F < S_{17} < 3.225F$ (adjustable)

10× Eyepiece
$.486F < S_{18} < .491F$
$.067F < S_{19} < .072F$

15× Eyepiece
$.345F < S_{18} < .350F$
$.005F < S_{19} < .009F$ $1.6115 < n_D (Xa) < 1.6145$
$1.5130 < n_D (Xb) < 1.5150$
$1.5130 < n_D (XIa) < 1.5150$
$1.6115 < n_D (XIb) < 1.6145$
$1.5160 < n_D (XII) < 1.5180$
$1.5160 < n_D (XIIIa) < 1.5180$
$1.7180 < n_D (XIIIb) < 1.7220$
$1.5715 < n_D (XIVa) < 1.5735$
$1.7180 < n_D (XVb) < 1.7220$ 10× Eyepiece
$1.5130 < n_D (XVI) < 1.5150$
$1.5130 < n_D (XVIIa) < 1.5150$
$1.7486 < n_D (XVIIb) < 1.7526$ 15× Eyepiece
$1.5130 < n_D (XVI) < 1.5150$
$1.5130 < n_D (XVIIa) < 1.5150$
$1.6895 < n_D (XVIIb) < 1.6925$ $43.9 < \nu (Xa) < 44.5$
$69.7 < \nu (Xb) < 70.7$
$69.7 < \nu (XIa) < 70.7$
$43.9 < \nu (XIb) < 44.5$
$64.0 < \nu (XII) < 65.0$
$64.0 < \nu (XIIIa) < 65.0$
$29.1 < \nu (XIIIb) < 29.5$
$56.9 < \nu (XIVa) < 57.9$
$36.3 < \nu (XIVb) < 36.9$
$64.0 < \nu (XVa) < 65.0$
$29.1 < \nu (XVb) < 29.5$ 10× Eyepiece
$69.7 < \nu (XVI) < 70.7$
$69.7 < \nu (XVIIa) < 70.7$
$27.6 < \nu (XVIIb) < 28.0$ 15× Eyepiece
$69.7 < \nu (XVI) < 70.7$
$69.7 < \nu (XVIIa) < 70.7$
$30.4 < \nu (XVIIb) < 31.0$ The specific constructional data for the second form of the invention as shown in FIG. 8 at 20 is given substantially in the table of equalities herebelow, the symbolism used therein meaning the same as in the foregoing Table I wherein F designates the focal length of the objective (X, XI),

TABLE II $-R_{31} = 9.220F$
$R_{32} = .753F$
$-R_{33} = .753F$
$R_{34} = .726F$
$-R_{35} = .781F$
$R_{36} = 6.148F$
$-R_{37} = 1.516F$
$R_{38} = 1.108F$
$R_{39} = 18.912F$
$R_{40} = .278F$
$R_{41} = .493F$
$R_{42} = 2.036F$
$-R_{43} = .323F$
$-R_{44} = .993F$
$R_{45} = 1.488F$
$R_{46} = .484F$
$R_{47} = .604F$

10× Eyepiece
$R_{48} = 1.011F$
$-R_{49} = 1.011F$
$R_{50} = .475F$
$-R_{51} = .550F$
$R_{52} = $ Plano 15× Eyepiece
$R_{48} = .687F$
$-R_{49} = .687F$
$R_{50} = .347F$
$-R_{51} = .347F$
$R_{52} = $ Plano $t_{21} = .069F$
$t_{22} = .093F$
$t_{23} = .103F$
$t_{24} = .069F$
$t_{25} = .039F$
$t_{26} = .039F$
$t_{27} = .039F$
$t_{28} = .069F$
$t_{29} = .042F$
$t_{30} = .032F$
$t_{31} = .032F$ 10× Eyepiece
$t_{32} = .185F$
$t_{33} = .229F$
$t_{34} = .035F$ 15× Eyepiece
$t_{32} = .125F$
$t_{33} = .155F$
$t_{34} = .023F$ $S_{11} = 1.889F$ (nominal-focusable)
$S_{12} = 0.29F$
(1× M) $S_{13} = .131F$
(3× M) $S_{13} = .622F$
(5× M) $S_{13} = .762F$
(7× M) $S_{13} = .834F$
$S_{14} = .016F$
(1× M) $S_{15} = 2.031F$
(3× M) $S_{15} = .995F$
(5× M) $S_{15} = .503F$
(7× M) $S_{15} = .154F$
(1× M) $S_{16} = .790F$
(3× M) $S_{16} = 1.335F$
(5× M) $S_{16} = 1.686F$
(7× M) $S_{16} = 1.964F$
$S_{17} = 3.086F$ (adjustable)

10× Eyepiece
$S_{18} = .489F$
$S_{19} = .069F$

15× Eyepiece
$S_{18} = .347F$
$S_{19} = .007F$ $n_D (Xa) = 1.613$ $n_D$ (Xb) = 1.514
$n_D$ (XIa) = 1.514
$n_D$ (XIb) = 1.613
$n_D$ (XII) = 1.517
$n_D$ (XIIIa) = 1.517
$n_D$ (XIIIb) = 1.720
$n_D$ (XIVa) = 1.573
$n_D$ (XIVb) = 1.617
$n_D$ (XVa) = 1.517
$n_D$ (XVb) = 1.720

10× Eyepiece {  $n_D$ (XVI) = 1.514
$n_D$ (XVIIa) = 1.514
$n_D$ (XVIIb) = 1.751  }

15× Eyepiece {  $n_D$ (XVI) = 1.514
$n_D$ (XVIIa) = 1.514
$n_D$ (XVIIb) = 1.691  }

$\nu$ (Xa) = 44.2
$\nu$ (Xb) = 70.2
$\nu$ (XIa) = 70.2
$\nu$ (XIb) = 44.2
$\nu$ (VII) = 64.5
$\nu$ (XIIIa) = 64.5
$\nu$ (XIIIb) = 29.3
$\nu$ (XIVa) = 57.4
$\nu$ (XIVb) = 36.6
$\nu$ (XVa) = 64.5
$\nu$ (XVb) = 29.3

10× Eyepiece {  $\nu$ (XVI) = 70.2
$\nu$ (XVIIa) = 70.2
$\nu$ (XVIIb) = 27.8  }

15× Eyepiece {  $\nu$ (XVI) = 70.2
$\nu$ (XVIIa) = 70.2
$\nu$ (XVIIb) = 30.7  }

Although only certain preferred forms of the present invention have been shown and described in detail, changes may be made therein both in the precise forms as well as the precise details of construction within the limits stated without departing from the spirit of the invention as defined in the claims appended herebelow.

We claim:

1. A zoom type of lens system for a microscope having a wide field and a high numerical aperture of nearly constant value on the exit side of said system whereby nearly constant image brightness is maintained throughout a continuous zooming magnification range of at least 1:7, said system including a plurality of optically aligned lenses which cooperatively form a stationary real image of continuously variable magnification of an object, said lenses named in sequence from the front of the system being:

a symmetrical objective comprising a pair of optically aligned positive doublet meniscus lenses which are substantially duplicates of each other and which are convex toward each other and have interfaces which are concave toward each other, and further comprising a double convex singlet lens spaced equally therebetween, said doublet lenses being designated I and III and said singlet lens being designated II, said objective being located at an axial distance $S_1$ away from said object, and the axial space between lenses II and III being designated $S_2$ and $S_3$ respectively, a movable front zoom lens member comprising a front double concave lens element designated IV which is spaced at a constant axial distance $S_5$ rearwardly of lens IV, said lens V having all of its refractive surfaces convex toward lens IV, a rear zoom lens designated 14 which is movable and is mounted at a continuously variable distance $S_6$ rearwardly of the first zoom lens, said rear lens being formed from a front double convex element and a rear negative meniscus element, said zoom lenses being moved continuously simultaneously axially in such a manner relative to said objective that a stationary real image of variable magnification is formed rearwardly thereof, a stationary relay lens located at a variable axial distance $S_7$ rearwardly of said zoom lenses, said relay lens being a negative meniscus doublet designated 15 and having all of its lens surfaces convex toward the zoom lenses, the foregoing lens parts cooperating to form said image at continuously variable magnifications at a stationary image plane located at an axial distance $S_8$ rearwardly from the relay lens, and an eyepiece focused on said image to view the same, the ranges of values for the constructional data related to said zoom system being given in the table of mathematical statements herebelow wherein $-R_1$ to $R_{19}$ represent the radii of the successive lens surfaces of said lenses, the minus (−) sign designating surfaces which are concave toward entrant light, $S_1$ to $S_8$ designate the aforesaid air spaces, $t_1$ to $t_{12}$ designate the axial thicknesses of the successive aforesaid lens elements in terms of F and the absolute values for the refractive index and Abbé number being $n_D$ and $\nu$ respectively for the glasses in said lens elements, $1.415F < -R_1 < 1.473F$
$1.155F < R_2 < 1.202F$  } Objective Lens I
$.814F < -R_3 < .847F$
$1.522F < R_4 < 1.584F$
$1.522F < -R_5 < 1.584F$  } Objective Lens II
$.814F < R_6 < .847F$
$1.155F < -R_7 < 1.202F$  } Objective Lens III
$1.415F < R_8 < 1.473F$
$1.494F < -R_9 < 1.556F$
$1.093F < R_{10} < 1.137F$  } Zoom Lens IV
$18.642F < R_{11} < 19.402F$
$.274F < R_{12} < .286F$  } Zoom Lens V
$.486F < R_{13} < .506F$
$2.007F < R_{14} < 2.089F$
$.318F < -R_{15} < .330F$  } Rear Zoom Lens
$.978F < -R_{16} < 1.018F$
$1.389F < R_{17} < 1.445F$
$.451F < R_{18} < .469F$  } Relay Lens
$.563F < R_{19} < .585F$ $S_1 = 1.877F$ (nominal-focusable)
$.0081F < S_2 < .0105F$
$.0081F < S_3 < .0105F$
$.057F < S_4 < .197F$ (m=1×)
$.551F < S_4 < .691F$ (m=3×)
$.692F < S_4 < .832F$ (m=5×)
$.746F < S_4 < .904F$ (m=7×)
$.015F < S_5 < .017F$
$1.903F < S_6 < 2.183F$ (m=1×)
$.861F < S_6 < 1.140F$ (m=3×)
$.366F < S_6 < .646F$ (m=5×)
$.015F < S_6 < .294F$ (m=7×)
$.724F < S_7 < 1.004F$ (m=1×)
$1.272F < S_7 < 1.552F$ (m=3×)
$1.626F < S_7 < 1.906F$ (m=5×)
$1.906F < S_7 < 2.185F$ (m=7×)
$2.810F < S_8 < 3.089F$ (adjustable)
$.060F < t_1 < .070F$
$.081F < t_2 < .091F$
$.065F < t_3 < .075F$
$.081F < t_4 < .091F$
$.060F < t_5 < .070F$
$.035F < t_6 < .044F$
$.035F < t_7 < .044F$
$.035F < t_8 < .044F$
$.065F < t_9 < .075F$
$.037F < t_{10} < .047F$
$.028F < t_{11} < .037F$
$.028F < t_{12} < .037F$ $1.6115 < n_D < 1.6145$
$43.9 < \nu < 44.5$  } Double concave element, Lenses I and III $1.513 < n_D < 1.515$
$69.7 < \nu < 70.7$  } Double convex element $1.516 < n_D < 1.518$
$64.0 < \nu < 65.0$  } Front Zoom Lens, Double concave element $1.516 < n_D < 1.518$
$64.0 < \nu < 65.0$  } Negative meniscus element, Front zoom lens $1.718 < n_D < 1.722$
$29.1 < \nu < 29.1$  } Positive meniscus element, Front zoom lens $1.5715 < n_D < 1.5735$
$56.9 < \nu < 57.9$  } Double concave element, Rear zoom lens $1.6155 < n_D < 1.6185$
$36.3 < \nu < 36.9$  } Negative meniscus element, Rear zoom lens $1.5160 < n_D < 1.5180$
$64.0 < \nu < 65.0$  } Negative meniscus element, Lenses I and III $1.7180 < n_D < 1.7220$
$29.1 < \nu < 29.5$  } Positive meniscus element, Relay lens 2. A zoom type of lens system as set forth in claim 1 further characterized by said eyepiece comprising a front double convex singlet lens VI which is spaced rearwardly from said image plane at an axial distance $S_9$, and is further comprised of a substantially plano convex doublet lens VII which is spaced at an axial distance $S_{10}$ from lens VI, the ranges of values in terms of F for the radii $R_{20}$ to $R_{24}$ of the successive lens surfaces counting from the entrance side, the air spaces $S_9$ and $S_{10}$, and the axial thicknesses $t_{13}$ to $t_{15}$ of the successive lens elements being given in the table herebelow, $$\left.\begin{array}{l}.997F < R_{20} < 1.037F \\ .997F < -R_{21} < 1.037F\end{array}\right\}\text{Lens VI}$$
$$\left.\begin{array}{l}.469F < R_{22} < .487F \\ .543F < -R_{23} < .565F \\ R_{24} > \pm 10.000F\end{array}\right\}\text{Lens VII} \left.\begin{array}{l}\text{Eyepiece } 10\times \text{ Power} \\ m = 10\times\end{array}\right.$$
$$\left.\begin{array}{l}.182F < t_{13} < .191F\end{array}\right\}\text{Lens VI}$$
$$\left.\begin{array}{l}.226F < t_{14} < .236F \\ .030F < t_{15} < .040F\end{array}\right\}\text{Lens VII}$$
$$.490F < S_9 < .494F$$
$$.068F < S_{10} < .072F$$

3. A zoom type of pancratic optical system as set forth in claim 1 further characterized by said eyepiece comprising a front double convex singlet lens VI which is spaced rearwardly from said image plane at an axial distance $S_9$, and is further comprised of a substantially plano convex doublet lens VII which is spaced at an axial distance $S_{10}$ from lens VI, the numerical values for magnification $m$, the radii $R_{20}$ to $R_{24}$ of the successive lens surfaces counting from the entrance side, the air spaces $S_9$ and $S_{10}$, and the axial thicknesses $t_{13}$ to $t_{15}$ of the successive lens elements being given in the table herebelow.

$$m = 15\times$$
$$\left.\begin{array}{l}.677F < R_{20} < .705F \\ .677F < -R_{21} < .705F\end{array}\right\}\text{Lens VI}$$
$$\left.\begin{array}{l}.343F < R_{22} < .355F \\ .343F < -R_{23} < .355F \\ R_{24} > \pm 10.000F\end{array}\right\}\text{Lens VII} \left.\begin{array}{l}\text{Eyepiece } 15\times \text{ Power}\end{array}\right.$$
$$\left.\begin{array}{l}.121F < t_{13} < .130F\end{array}\right\}\text{Lens VI}$$
$$\left.\begin{array}{l}.151F < t_{14} < .161F \\ .019F < t_{15} < .028F\end{array}\right\}\text{Lens VII}$$
$$.347F < S_9 < .352F$$
$$.0046F < S_{10} < .0093F$$

4. A zoom type of optical system for a microscope having wide field and a high numerical aperture of nearly constant value on the exit side of said system whereby nearly constant image brightness is maintained throughout a zoom magnification range of at least 1:7, said system including a plurality of optically aligned lenses which cooperatively from a stationary real image of continuously variable magnification of an object, said lenses named in sequence from the front of the system being:

a symmetrical objective comprising a pair of optically aligned positive doublet meniscus lenses which are subtantially duplicates of each other and which are convex toward each other and have interfaces which are concave toward each other, and further comprising a double convex singlet lens spaced equally therebetween, said doublet lenses being designated I and III and said singlet lens being designated II, said objective being located at an axial distance $S_1$ away from said object, and the axial space between lenses I and II and between lenses II and III being designated $S_2$ and $S_3$ respectively, a movable front zoom lens comprising a front double concave lens element designated IV which is spaced at a variable axial distance $S_4$ rearwardly of said objective and a doublet negative meniscus lens designated V located at a constant distance $S_5$ rearwardly of lens IV, said lens V having all of its refractive surfaces convex toward lens IV, a rear zoom lens which is movably mounted at a variable distance $S_6$ rearwardly of the first zoom lens, said lens being formed from a front double convex element and a rear negative meniscus element, said zoom lenses being moved axially continuously simultaneously relative to said objective so that a stationary real image of variable magnification is formed, a stationary relay lens located at a variable axial distance $S_7$ rearwardly of said zoom lenses, said relay lens being comprised of a negative meniscus doublet having all of its lens surfaces convex toward the zoom lenses, the foregoing lens parts cooperating to form said image of continuously variable magnification at a stationary image plane located at an axial distance $S_8$ rearwardly from the relay lens, and an eyepiece focused on said image to view the same, the values for the constructional data related to said optical system being given substantially in the table of mathematical statements herebelow wherein $-R_1$ to $R_{19}$ represent the radii of the successive lens surfaces of said lenses, the minus ($-$) sign designating surfaces which are concave toward entrant light, $S_1$ to $S_8$ designate the aforesaid air spaces, $t_1$ to $t_{12}$ designates the axial thicknesses of the successive aforesaid lens elements, and the absolute values for the refractive index and Abbé number being $n_D$ and $\nu$ respectively for the glasses in said lens lements, $$\left.\begin{array}{l}-R_1 = 1.444F \\ R_2 = 1.178F \\ -R_3 = .830F\end{array}\right\}\text{Lens I}$$
$$\left.\begin{array}{l}R_4 = 1.553F \\ -R_5 = 1.553F \\ R_6 = .830F\end{array}\right\}\text{Lens II}$$
$$\left.\begin{array}{l}-R_7 = 1.178F \\ R_8 = 1.444\end{array}\right\}\text{Lens III}$$
$$\left.\begin{array}{l}-R_9 = 1.525F \\ R_{10} = 1.115F \\ R_{11} = 19.022F \\ R_{12} = .280F \\ R_{13} = .496F\end{array}\right\}\text{Front Zoom Lens}$$
$$\left.\begin{array}{l}R_{14} = 2.048F \\ -R_{15} = .324F \\ -R_{16} = .998F\end{array}\right\}\text{Rear Zoom Lens}$$
$$\left.\begin{array}{l}R_{17} = 1.417F \\ R_{18} = .460F \\ R_{19} = .574F\end{array}\right\}\text{Relay Lens}$$
$$\left.\begin{array}{l}t_1 = .065F \\ t_2 = .086F\end{array}\right\}\text{Lens I}$$
$$t_3 = .070F \quad \text{Lens II}$$
$$\left.\begin{array}{l}t_4 = .086F \\ t_5 = .064F\end{array}\right\}\text{Lens III}$$
$$t_6 = .040F \quad \text{Lens IV}$$
$$\left.\begin{array}{l}t_7 = .040F \\ t_8 = .040F \\ t_9 = .070F\end{array}\right\}\text{Lens V}$$
$$t_{10} = .042F$$
$$\left.\begin{array}{l}t_{11} = .033F \\ t_{12} = .033F\end{array}\right\}\text{Relay Lens}$$
$$S_1 = 1.887F$$
$$S_2 = .009F$$
$$S_3 = .009F$$
$$S_4 = .127F \quad (m = 1\times)$$
$$S_4 = .621F \quad (m = 3\times)$$
$$S_4 = .762F \quad (m = 5\times)$$
$$S_4 = .834F \quad (m = 7\times)$$
$$S_5 = .016F$$
$$S_6 = 2.043F \quad (m = 1\times)$$
$$S_6 = 1.001F \quad (m = 3\times)$$
$$S_6 = .506F \quad (m = 5\times)$$
$$S_6 = .155F \quad (m = 7\times)$$
$$S_7 = .864F \quad (m = 1\times)$$
$$S_7 = 1.412F \quad (m = 3\times)$$
$$S_7 = 1.766F \quad (m = 5\times)$$
$$S_7 = 2.045F \quad (m = 7\times)$$
$$S_8 = 2.950F$$

$$\left.\begin{array}{l}n_D = 1.613 \\ \nu = 44.2\end{array}\right\}\text{Lenses I and III, Double concave element}$$
$$\left.\begin{array}{l}n_D = 1.517 \\ \nu = 70.2\end{array}\right\}\text{Lenses I and III, Double convex element}$$
$$\left.\begin{array}{l}n_D = 1.514 \\ \nu = 70.2\end{array}\right\}\text{Lens II}$$

$$\left.\begin{array}{l}n_D = 1.517 \\ \nu = 64.5\end{array}\right\}\text{Lens IV, Double concave element}$$
$$\left.\begin{array}{l}n_D = 1.517 \\ \nu = 64.5\end{array}\right\}\text{Lens V, Negative meniscus element}$$
$$\left.\begin{array}{l}n_D = 1.720 \\ \nu = 29.3\end{array}\right\}\text{Lens V, Positive meniscus element}$$
$$\left.\begin{array}{l}n_D = 1.573 \\ \nu = 57.4\end{array}\right\}\text{Rear zoom lens, Double convex element}$$
$$\left.\begin{array}{l}n_D = 1.617 \\ \nu = 36.6\end{array}\right\}\text{Rear zoom lens, Negative meniscus element}$$
$$\left.\begin{array}{l}n_D = 1.517 \\ \nu = 64.5\end{array}\right\}\text{Relay lens, Negative meniscus element}$$
$$\left.\begin{array}{l}n_D = 1.720 \\ \nu = 29.3\end{array}\right\}\text{Relay lens, Positive meniscus element}$$

5. A zoom type of pancratic optical system as set forth in claim 4 further characterized by said eyepiece comprising a front double convex singlet lens VI which is spaced rearwardly from said image plane at an axial distance $S_9$, and is further comprised of a substantially plano convex doublet lens VII which is spaced at an axial distance $S_{10}$ from lens VI, the numerical values for magnification $m$, the radii $R_{20}$ to $R_{24}$ of the successive lens surfaces, the axial thicknesses $t_{13}$ to $t_{15}$ of the successive lens elements, the successive air spaces $S_9$ and $S_{10}$, and the refractive index $n_D$ and Abbé number $\nu$ of the glasses from which said elements are made being given in the table herebelow, $m=10\times$ $R_{20}=1.017F$ } Lens VI
$-R_{21}=1.017F$ $R_{22}=.478F$ } Lens VII
$-R_{23}=.554F$ $R_{24}=$ Plano $t_{13}=.186F$ Lens VI $t_{14}=.231F$ } Lens VII
$t_{15}=.035F$ $S_9=.491F$
$S_{10}=.070F$ $n_D=1.514$ } Lens VI
$\nu=70.2$ $n_D=1.514$ } Lens VII positive element
$\nu=70.2$ $n_D=1.751$ } Lens VII negative element
$\nu=27.8$ 6. A zoom type of pancratic optical system as set forth in claim 4 further characterized by said eyepiece comprising a front double convex singlet lens VI which is spaced rearwardly from said image plane at an axial distance $S_9$, and is further comprised of a substantially plano convex doublet lens VII which is spaced at an axial distance $S_{10}$ from lens VI, the numerical values for magnification $m$, the radii $R_{20}$ to $R_{24}$ of the successive lens surfaces, the axial thicknesses $t_{13}$ to $t_{15}$ of the successive lens elements, the successive air spaces $S_9$ and $S_{10}$, and the refractive index $n_D$ and Abbé number $\nu$ of the glasses from which said elements are made being given in the table herebelow, $m=15\times$ $R_{20}=.691F$ } Lens VI
$-R_{21}=.691F$ $R_{22}=.349F$ } Lens VII
$-R_{23}=.349F$ $R_{24}=$ Plano $t_{13}=.126F$ Lens VI $t_{14}=.156F$ } Lens VII
$t_{15}=.023F$ $S_9=.348F$
$S_{10}=.007F$ $n_D=1.514$ } Lens VI
$\nu=70.2$ $n_D=1.514$ } Lens VII positive element
$\nu=70.2$ $n_D=1.691$ } Lens VII negative element
$\nu=30.7$ 7. A zoom type of lens system for a microscope having a wide field and a high numerical aperture of nearly constant value on the exit side of said system whereby nearly constant image brightness is maintained throughout a continuous zooming magnification range of at least 1:7, said system including a plurality of optically aligned lenses which cooperatively form a stationary real image of continuously variable magnification of an object, said lenses named in sequence from the front of the system being:

an objective comprising a pair of positive doublet meniscus lenses designated X and XI which are convex toward each other, the front doublet lens X being formed from a front double concave lens element Xa and a rear double convex element Xb and the rear doublet lens XI being formed from a front double convex lens XIa and a rear double concave element XIb, said objective being located at focusable axial distance designated $S_{11}$ away from said object, the axial space between lenses X and XI being designated $S_{12}$, a movable front zoom lens member comprising a front double concave singlet lens element designated XII which is spaced at a continuously variable axial distance $S_{13}$ rearwardly of lens XI, and a doublet negative meniscus lens designated XIII located at a constant axial distance $S_{14}$ rearwardly of lens XII, lens XIII having all of its refractive surfaces convex toward lens XII and comprising a front negative meniscus lens element XIIIa and a rear positive meniscus element XIIIb, a rear zoom lens member which is designated XIV and is movably mounted at a continuously variable distance $S_{15}$ rearwardly of zoom lens member XIII, lens XIV being formed from a front double convex element XIVa and a rear negative meniscus element XIVb, the zoom lens members being moved continuously simultaneously axially relative to a stationary point on the optical axis in such a manner relative to said objective lenses that a stationary real image of continuously variable magnification is formed rearwardly at an image plane, a stationary relay lens designated XV located at a variable axial distance $S_{16}$ rearwardly of said lens XIV, said relay lens being a negative meniscus doublet and being comprised of a front negative meniscus element XVa which lies in contact with a rear positive meniscus lens element XVb, lens XV being concave toward the rear, the foregoing lens members cooperating to form said image at continuously variable magnifications at a substantially stationary position located at a constant distance $S_{17}$ from lens XV, and an eyepiece focused on said image to view the same, the ranges of values for the constructional data related to said zoom system being given in the table of mathematical statements herebelow wherein $-R_{31}$ to $R_{47}$ represent the radii of the successive lens surfaces of said lenses, the minus (−) sign used with some designations meaning that this surface is concave toward the front of the system, $S_{11}$ to $S_{17}$ designate the successive airspaces, $t_{21}$ to $t_{31}$ designate the axial thicknesses of the successive lens elements in terms of F, which represents the equivalent focal length of said objective and the absolute values for the refractive index and Abbé number being designated $n_D$ and $\nu$ respectively for the glasses in said lens elements,

LENS X $9.036F<-R_{31}<9.405F$
$.738F<R_{32}<.768F$
$.738F<-R_{33}<.768F$

LENS XI $.711F<R_{34}<.740F$
$.766F<-R_{35}<.797F$
$6.025F<R_{36}<6.271F$

LENS XII $1.486F<-R_{37}<1.546F$
$1.086F<R_{38}<1.131F$

LENS XIII $18.534F<R_{39}<19.290F$
$.273F<R_{40}<.284F$
$.483F<R_{41}<.503F$

LENS XIV $1.995F<R_{42}<2.077F$
$.316F<-R_{43}<.329F$
$.973F<-R_{44}<1.012F$

LENS XV $1.459F<R_{45}<1.518F$
$.474F<R_{46}<.494F$
$.592F<R_{47}<.616F$ $S_{11}=1.889F$ (nominal adjustable)
$.027F<S_{12}<.031F$
$.061F<S_{13}<.200F$ ($m=1\times$)
$.553F<S_{13}<.692F$ ($m=3\times$)
$.693F<S_{13}<.832F$ ($m=5\times$)
$.764F<S_{13}<.903F$ ($m=7\times$)
$.015F<S_{14}<.017F$
$1.892F<S_{15}<2.170F$ ($m=1\times$)
$.856F<S_{15}<1.134F$ ($m=3\times$)
$.364F<S_{15}<.642F$ ($m=5\times$)
$.015F<S_{15}<.293F$ ($m=7\times$)
$.651F<S_{16}<.929F$ ($m=1\times$)
$1.196F<S_{16}<1.474F$ ($m=3\times$)

$1.548F < S_{16} < 1.825F$ ($m=5\times$)
$1.825F < S_{16} < 2.103F$ ($m=7\times$)
$2.947F < S_{17} < 3.225F$
$.065F < t_{21} < .074F$
$.090F < t_{22} < .095F$
$.101F < t_{23} < .105F$
$.065F < t_{24} < .074F$
$.035F < t_{25} < .044F$
$.035F < t_{26} < .044F$
$.035F < t_{27} < .044F$
$.065F < t_{28} < .074F$
$.037F < t_{29} < .046F$
$.030F < t_{30} < .035F$
$.030F < t_{31} < 0.35F$
$1.5130 < n_D$ ($Xb$) $< 1.5150$
$1.5130 < n_D$ ($XIa$) $< 1.5150$
$1.6115 < n_D$ ($Xa$) $< 1.6145$
$1.6115 < n_D$ ($XIb$) $< 1.6145$
$1.5160 < n_D$ ($XII$) $< 1.5180$
$1.5160 < n_D$ ($XIIIa$) $< 1.5180$
$1.7180 < n_D$ ($XIIIb$) $< 1.7220$
$1.5715 < n_D$ ($XIVa$) $< 1.5735$
$1.6155 < n_D$ ($XIVb$) $< 1.6185$
$1.5160 < n_D$ ($XVa$) $< 1.5180$
$1.7180 < n_D$ ($XVb$) $< 1.7220$
$43.9 < \nu$ ($Xa$) $< 44.5$
$69.7 < \nu$ ($Xb$) $< 70.7$
$69.7 < \nu$ ($XIa$) $< 70.7$
$43.9 < \nu$ ($XIb$) $< 44.5$
$64.0 < \nu$ ($XII$) $< 65.0$
$64.0 < \nu$ ($XIIIa$) $< 65.0$
$29.1 < \nu$ ($XIIIb$) $< 29.5$
$56.9 < \nu$ ($XIVa$) $< 57.9$
$36.3 < \nu$ ($XIVb$) $< 36.9$
$64.0 < \nu$ ($XVa$) $< 65.0$
$29.1 < \nu$ ($XVb$) $< 29.5$ 8. A zoom type of lens system as set forth in claim 7 further characterized by said eyepiece comprising a front double convex singlet lens XVI which is spaced rearwardly of said image plane at an axial distance $S_{18}$ and is further comprised of a substantially plano convex doublet lens XVII which is spaced at an axial distance $S_{19}$ from lens XVI, lens XVII comprising a front double convex lens element XVIIa which contacts a rear plano concave lens element XVIIb, the ranges of values in terms of F for the radii $R_{48}$ to $R_{52}$ of the successive lens surfaces numbering from the front, the air spaces $S_{18}$ and $S_{19}$, the axial thicknesses $t_{32}$ to $t_{34}$ as well as the refractive index $n_D$ and Abbé number $\nu$ of the glass in the successive lens elements being given in the table herebelow, $m$ meaning image magnification, $m=10\times$
$.991F < R_{48} < 1.031F$
$.991F < -R_{49} < 1.031F$
$.466F < R_{50} < .484F$
$.539F < -R_{51} < .561F$
$R_{52} > \pm 10.0F$
$.181F < t_{32} < .190F$
$.225F < t_{33} < .234F$
$.030F < t_{34} < .039F$
$.486F < S_{18} < .491F$
$.067F < S_{19} < .072F$
$1.5130 < n_D$ ($XVI$) $< 1.5150$
$1.5130 < n_D$ ($XVIIa$) $< 1.5150$
$1.7486 < n_D$ ($XVIIb$) $< 1.7526$
$69.7 < \nu$ ($XVI$) $< 70.7$
$69.7 < \nu$ ($XVIIa$) $< 70.7$
$27.6 < \nu$ ($XVIIb$) $< 28.0$ 9. A zoom type of lens system as set forth in claim 7 further characterized by said eyepiece comprising a front double convex singlet lens XVI which is spaced rearwardly of said image plane at an axial distance $S_{18}$ and is further comprised of a substantially plano convex doublet lens XVII which is spaced at an axial distance $S_{19}$ from lens XVI, lens XVII comprising a front double convex lens element XVIIa which contacts a rear a plano concave lens element XVIIb, the specific values in terms of F for the radii $R_{48}$ to $R_{52}$ of the successive lens surfaces numbering from the front, the air spaces $S_{18}$ and $S_{19}$, the axial thicknesses $t_{32}$ to $t_{34}$ as well as the refractive index $n_D$ and Abbé number $\nu$ of the glass in the successive lens elements being given substantially in the table herebelow, $m$ meaning image magnification, $m=15\times$
$.673F < R_{48} < .700F$
$.673F < -R_{49} < .700F$
$.340F < R_{50} < .354F$
$.340F - R_{51} < .354F$
$R_{52} > \pm 10.0F$
$.120F < t_{32} < .130F$
$.150F < t_{33} < .160F$
$.019F < t_{34} < .028F$
$.345F < S_{18} < .350F$
$.005F < S_{19} < .009F$
$1.5130 < n_D$ ($XVI$) $< 1.5150$
$1.5130 < n_D$ ($XVIIa$) $< 1.5150$
$1.6895 < n_D$ ($XVIIb$) $< 1.6925$
$69.7 < \nu$ ($XVI$) $< 70.7$
$69.7 < \nu$ ($XVIIa$) $< 70.7$
$30.4 < \nu$ ($XVIIb$) $< 31.0$ 10. A zoom type of lens system for a microscope having a wide field and a high numerical sperture of nearly constant value on the exit side of said system whereby nearly constant image brightness is maintained throughout a continuous zooming magnification range of at least 1:7, said system including a plurality of optically aligned lenses which cooperatively form a stationary real image of continuously variable magnification of an object, said lenses named in sequence from the front of the system being:

an objective comprising a pair of positive doublet meniscus lenses designated X and XI which are convex toward each other, the front doublet lens X being formed from a front double concave lens element $Xa$ and a rear double convex element $Xb$ and the rear doublet lens XI being formed from a front double convex lens $XIa$ and, a rear double concave element $XIb$, said objective being located at focusable axial distance designated $S_{11}$ away from said object, the axial space between lenses X and XI being designated $S_{12}$, a movable front zoom lens member comprising a front double concave singlet lens element designated XII which is spaced at a continuously variable axial distance $S_{13}$ rearwardly of lens XI, and a doublet negative meniscus lens designated XIII located at a constant axial distance $S_{14}$ rearwardly of lens XII, lens XIII having all of its refractive surfaces convex toward lens XII and comprising a front negative meniscus lens element $XIIIa$ and a rear positive meniscus element $XIIIb$, a rear zoom lens member which is designated XIV and is movably mounted at a continuously variable distance $S_{15}$ rearwardly of zoom lens member XIII, lens XIV being formed from a front double convex element $XIVa$ and a rear negative meniscus element $XIVb$, the zoom lens members being moved continuously simultaneously axially relative to a stationary point on the optical axis in such a manner relative to said objective lenses that a stationary real image of continuously variable magnification is formed rearwardly at an image plane, a stationary relay lens located at a variable axial distance $S_{16}$ rearwardly of said lens XIV, said relay lens being a negative meniscus doublet designated XV and being comprised of a front negative meniscus element XVa which lies in contact with a rear positive meniscus lens element XVb, lens XV being concave toward the rear, the foregoing lens members cooperating to form said image at continuously variable magnifications at a substantially stationary position located at a constant distance $S_{17}$ from lens XV, and an eyepiece focused on said image to view the same, the specific values for the constructional data related to said zoom system being given substantially in the table of mathematical statements herebelow wherein $-R_{31}$ to $R_{47}$ represent the radii of the successive lens surfaces of said lenses, the minus (−) sign used with some designations meaning that this surface is concave toward the front of the system, $S_{11}$ to $S_{17}$ designate the successive airspaces, $t_{21}$ to $t_{31}$ designate the axial thicknesses of the successive lens elements in terms of F, which represents the equivalent focal length of said objective and the absolute values for the refractive index and Abbé number being designated $n_D$ and $\nu$ respectively for the glasses in said lens elements,

LENS X
$-R_{31} = 9.220F$
$R_{32} = .753F$
$-R_{33} = .753F$

LENS XI
$R_{34} = .726F$
$-R_{35} = .781F$
$R_{36} = 6.148F$

LENS XII
$-R_{37} = 1.516F$
$R_{38} = 1.108F$

LENS XIII
$R_{39} = 18.912F$
$R_{40} = .278F$
$R_{41} = .493F$

LENS XIV
$R_{42} = 2.036F$
$-R_{43} = .323F$
$-R_{44} = .993F$

LENS XV
$R_{45} = 1.488F$
$R_{46} = .484F$
$R_{47} = .604F$ $S_{11} = 1.889F$ (nominal adjustable)
$S_{12} = .029F$
$S_{13} = .131F$ ($m = 1\times$)
$S_{13} = .622F$ ($m = 3\times$)
$S_{13} = .762F$ ($m = 5\times$)
$S_{13} = .834F$ ($m = 7\times$)
$S_{14} = .016F$
$S_{15} = 2.031F$ ($m = 1\times$)
$S_{15} = .995F$ ($m = 3\times$)
$S_{15} = .503F$ ($m = 5\times$)
$S_{15} = .154F$ ($m = 7\times$)
$S_{16} = .790F$ ($m = 1\times$)
$S_{16} = 1.335F$ ($m = 3\times$)
$S_{16} = 1.686F$ ($m = 5\times$)
$S_{16} = 1.964F$ ($m = 7\times$)
$S_{17} = 3.086F$
$t_{21} = .069F$
$t_{22} = .093F$
$t_{23} = .103F$
$t_{24} = .069F$
$t_{25} = .039F$
$t_{26} = .039F$
$t_{27} = .039F$
$t_{28} = .069F$
$t_{29} = .042F$
$t_{30} = .032F$
$t_{31} = .032F$
$n_D$ (Xa) = 1.613
$n_D$ (Xb) = 1.514
$n_D$ (XIa) = 1.514
$n_D$ (XIb) = 1.613
$n_D$ (XII) = 1.517
$n_D$ (XIIIa) = 1.517
$n_D$ (XIIIb) = 1.720
$n_D$ (XIVa) = 1.573
$n_D$ (XIVb) = 1.617
$n_D$ (XVa) = 1.517
$n_D$ (XVb) = 1.720
$\nu$ (Xa) = 44.2
$\nu$ (Xb) = 70.2
$\nu$ (XIa) = 70.2
$\nu$ (XIb) = 44.2
$\nu$ (XII) = 64.5
$\nu$ (XIIIa) = 64.5
$\nu$ (XIIIb) = 29.3
$\nu$ (XIVa) = 57.4
$\nu$ (XIVb) = 36.6
$\nu$ (XVa) = 64.5
$\nu$ (XVb) = 29.3

11. A zoom lens system as set forth in claim 10 further characterized by said eyepiece comprising a front double convex singlet lens XVI which is spaced rearwardly of said image plane at an axial distance $S_{18}$ and is further comprised of a substantially plano convex doublet lens XVII which is spaced at an axial distance $S_{19}$ from lens XVI, lens XVII comprising a front double convex lens element XVIIa which contacts a rear plano concave lens element XVIIb, the specific values in terms of F for the radii $R_{48}$ to $R_{52}$ of the successive lens surfaces numbering from the front, the air spaces $S_{18}$ and $S_{19}$, the axial thicknesses $t_{32}$ to $t_{34}$ as well as the refractive index $n_D$ and Abbé number $\nu$ of the glass in the successive lens elements being given substantially in the table herebelow, $m$ meaning image magnification, $m = 10\times$
$R_{48} = 1.011F$
$-R_{49} = 1.011F$
$R_{50} = .475F$
$-R_{51} = .550F$
$R_{52}$ = Plano
$t_{32} = .185F$
$t_{33} = .229F$
$t_{34} = .035F$
$S_{18} = .489F$
$S_{19} = .069F$
$n_D$ (XVI) = 1.514
$n_D$ (XVIIa) = 1.514
$n_D$ (XVIIb) = 1.751
$\nu$ (XVI) = 70.2
$\nu$ (XVIIa) = 70.2
$\nu$ (XVIIb) = 27.8

12. A zoom type of lens system as set forth in claim 10 further characterized by said eyepiece comprising a front double convex singlet lens XVI which is spaced rearwardly of said image plane at an axial distance $S_{18}$ and is further comprised of a substantially plano convex doublet lens XVII which is spaced at an axial distance $S_{19}$ from lens XVI, lens XVII comprising a front double convex lens element XVIIa which contacts a rear plano concave lens element XVIIb, the specific values in terms of F for the radii $R_{48}$ to $R_{52}$ of the successive lens surfaces numbering from the front, the air spaces $S_{18}$ and $S_{19}$, the axial thicknesses $t_{32}$ to $t_{34}$ as well as the refractive index $n_D$ and Abbé number $\nu$ of the glass in the successive lens elements being given substantially in the table herebelow, $m$ meaning image magnification, $$m = 15\times$$
$$R_{48} = .687F$$
$$-R_{49} = .687F$$
$$R_{50} = .347F$$
$$-R_{51} = .347F$$
$$R_{52} = \text{Plano}$$
$$t_{32} = .125F$$
$$t_{33} = .155F$$
$$t_{34} = .023F$$
$$S_{18} = .347F$$
$$S_{19} = .007F$$
$$n_D \text{ (XVI)} = 1.514$$
$$n_D \text{ (XVIIa)} = 1.514$$
$$n_D \text{ (XVIIb)} = 1.691$$
$$\nu \text{ (XVI)} = 70.2$$
$$\nu \text{ (XVIIa)} = 70.2$$
$$\nu \text{ (XVIIb)} = 30.7$$

References Cited

UNITED STATES PATENTS 3,057,259  10/1962  Schuma _____ 350—43 X

JOHN K. CORBIN, *Primary Examiner.*

U.S. Cl. X.R.

350—184, 214, 215, 231

UNITED STATES PATENT OFFICE
CERTIFICATE OF CORRECTION

Patent No. 3,421,807                                          January 14, 1969

Paul E. Nothnagle et al.

It is certified that error appears in the above identified patent and that said Letters Patent are hereby corrected as shown below:

Column 12, line 54, "$S_{12}=0.29F$" should read -- $S_{12}=.029F$ --. Column 13, line 23, "$\nu(VII)=64.5$" should read -- $\nu(XII)=64$ --. Column 15, line 39, "from" should read -- form --. Column 16, line 15, "lements" should read -- elements --; line 33, "$t_5=.064F$" should read -- $t_5=.065F$ --; line 36, "$t_{10}=.042F$" should read -- $t_{10}=.042F$) Rear Zoom Lens --. Column 19, line 14, "$.030F<t_{31}<0.35F$" should read -- $.030F<t_{31}<.035F$ --; line 17, cancel "$1.6115<n_D(Xa)<1.6145$" and insert the same between lines 14 and 15, same column 19.

Signed and sealed this 24th day of March 1970.

(SEAL)
Attest:

EDWARD M. FLETCHER, JR.                             WILLIAM E. SCHUYLER, JR.
Attesting Officer                                        Commissioner of Patents